No. 776,465. PATENTED NOV. 29, 1904.
C. A. GILDEMEYER.
SPIGOT.
APPLICATION FILED APR. 15, 1904.
NO MODEL.
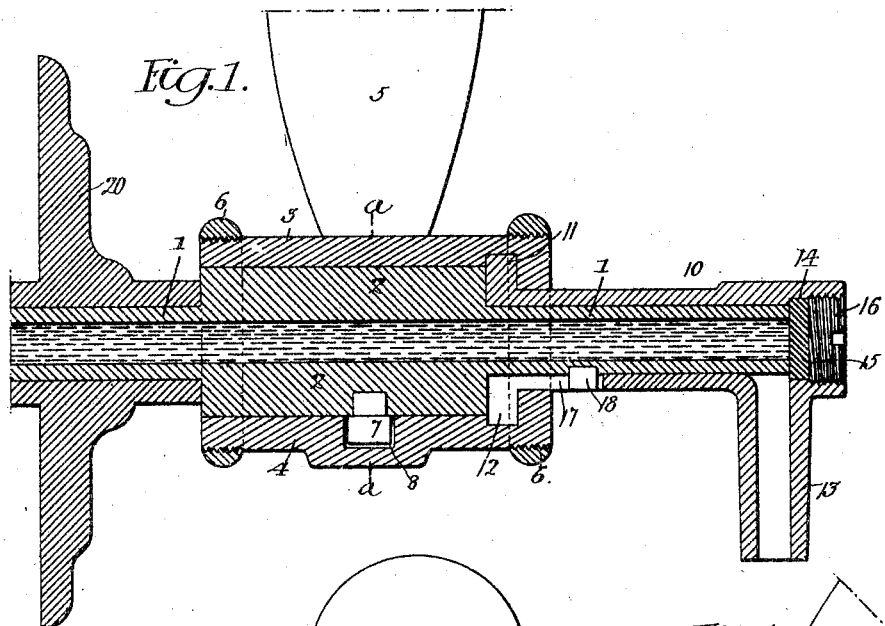
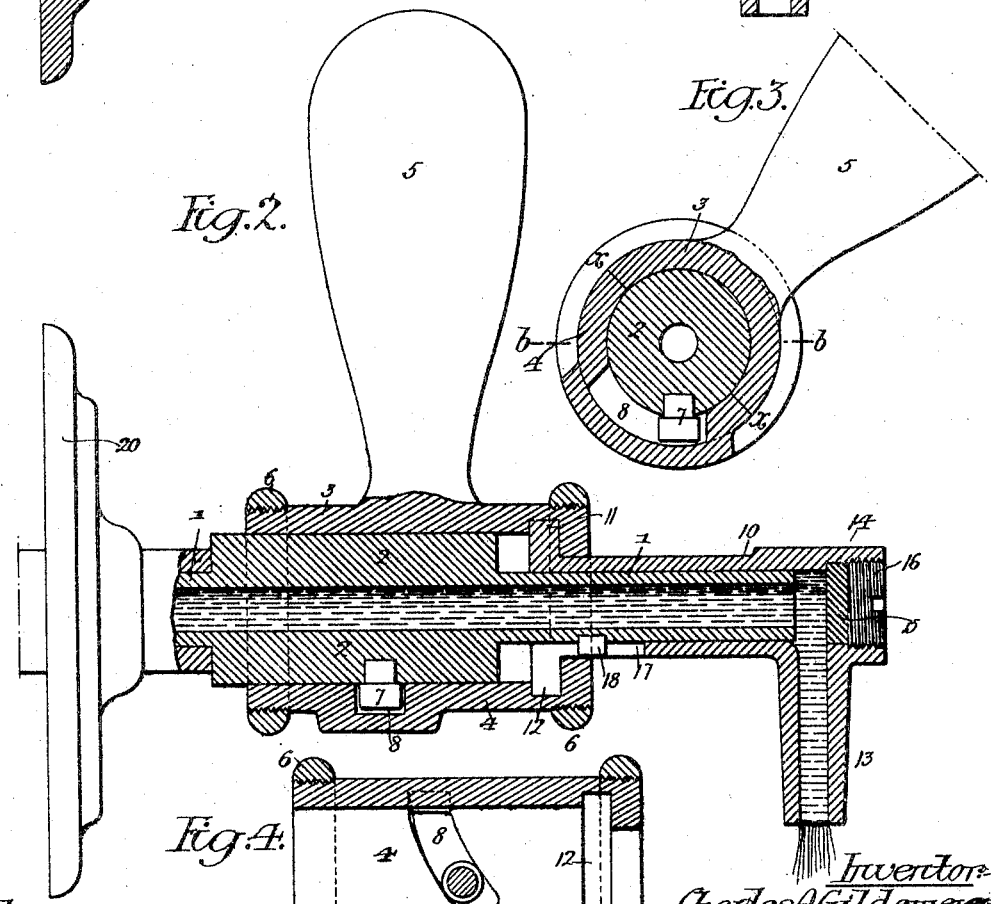
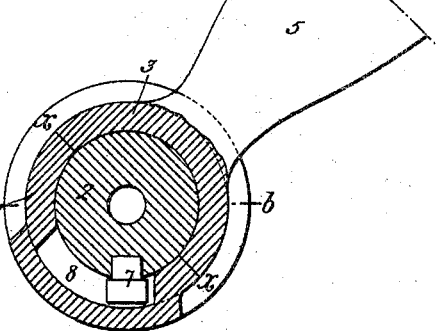
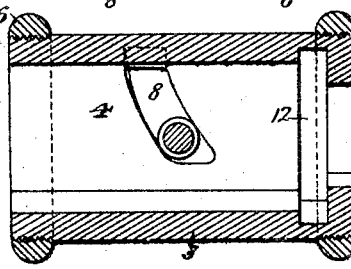
Witnesses:
Inventor:
Charles A. Gildemeyer
by his Attorneys,
Howson & Howson No. 776,465. Patented November 29, 1904.

UNITED STATES PATENT OFFICE.

CHARLES A. GILDEMEYER, OF PHILADELPHIA, PENNSYLVANIA.

SPIGOT.

SPECIFICATION forming part of Letters Patent No. 776,465, dated November 29, 1904.

Application filed April 15, 1904. Serial No. 203,332. (No model.)

*To all whom it may concern:*

Be it known that I, CHARLES A. GILDEMEYER, a citizen of the United States, residing in Philadelphia, Pennsylvania, have invented certain Improvements in Spigots, of which the following is a specification.

My invention relates to spigots in general, but more particularly to those employed for drawing liquids under pressure, notably beer. The improved spigot forming the subject of my invention is of that class in which a weighted handle is employed which serves to close the spigot by gravity, such handle being in the lowered position when the spigot is closed.

My invention is fully illustrated in the accompanying drawings, in which—

Figure 1 is a sectional elevation of the spigot forming the subject of my invention, showing the same closed. Fig. 2 is a similar sectional view showing the spigot open. Fig. 3 is a cross-sectional view on the line $a$ $a$, Fig. 1; and Fig. 4 is a sectional view on the line $b$ $b$, Fig. 3, showing a portion of the structure detached and illustrating a detail of my invention.

The object of my invention is to simplify the construction and operation of spigots of this character and while providing a simple form of valve to arrange the same in such a manner that it may be readily opened and closed, the whole structure being composed of few parts, which can be readily cast, finished cheaply, and assembled in a simple manner.

In the drawings herewith, 1 represents the pipe leading from the source of supply, which pipe is provided with an enlarged portion 2, which I term the "body" portion. Surrounding this body portion are the separable sections 3 and 4 of the two-part hub, to one of which sections the handle 5 is attached. This two-part hub is separated at the point $x$ (shown in Fig. 3) and is held together by the rings 6, which are threaded onto the ends of the same. The hub has a limited rotary movement with respect to the body 2, such movement being limited by a projection 7, carried by the body portion 2, which is adapted to engage the walls of the cam-recess 8, formed in the hub-section 4.

The spigot proper consists of the L-shaped tubular member 10, having an annular shouldered portion 11 fitting the annular recess 12 in the hub-sections 3 and 4 and having also a discharge-outlet 13. At the end of the tubular member a recess 14 is provided for the packing 15, such recess being threaded for the reception of a screw-plug 16 to retain said packing in position. This member 10 is further slotted at 17, whereby it may be guided with respect to the pipe 1 by means of a projection 18, carried by said pipe. The cam-slot extends at an angle with respect to the hub-section 4, so that upon turning said hub-section by the aid of the handle 5 the cam will be acted upon by the fixed projection 7, and the hub will be thereby moved out of the position shown in Fig. 2, carrying with it spigot-section or tubular member 10 away from the end of the pipe 1, permitting the flow of liquid through said pipe and the discharge-outlet 13 of the spigot. To close the spigot, it is only necessary to drop the handle to the inclined position shown in Figs. 1 and 3, whereupon the reverse action between said parts will take place and the spigot-section will be retracted and its seat brought into contact with the end of the pipe or tube 1. The finish-plate 20 may be threaded onto the pipe 1, if desired, so as to retain the other parts in proper position thereto when the fitting is set in place. The only part to wear in the matter is the gasket carried by the tubular member 10, with which the end of the tube or pipe 1 engages, and this is mounted in such a manner that it can be readily replaced when worn.

Having thus described my invention, I claim and desire to secure by Letters Patent—

1. The combination in a spigot, of the supply-pipe, a projection carried by the same, a two-part rotatable hub carried by said pipe, one section of said hub having a cam-groove to receive the projection of the same, a movable discharge-section mounted on the pipe, and provision for placing said discharge-section in operative engagement with the hub whereby the movement of the latter in engagement with the projection will cause the discharge-section to be pushed away from the end of the pipe thereby opening the spigot.

2. The combination in a spigot, of the supply-pipe, a projection carried by the same, a two-part hub carried by said pipe, one section of said hub having a cam-groove to receive the projection of the same, a movable discharge-section mounted on the pipe, provision for placing said discharge-section in operative engagement with the two-part hub whereby the movement of the latter in engagement with the projection will cause the discharge-section to be pushed away from the tubular stem thereby opening the spigot, and a weighted handle carried by the hub whereby it may be operated, said handle serving to keep the spigot closed when in the lowered position.

3. The combination in a spigot, of the supply-pipe, an enlargement carried thereby, a projection carried by said enlargement, a two-part rotatable hub carried by said pipe and surrounding the enlarged portion of the same, rings for confining the section of said hub together, one of said sections having a cam-groove for engagement with the projection carried by the enlargement of the pipe, and a discharge-section confined in operative relation with the two-part hub, said discharge-section sliding on said pipe thereby opening the spigot as the hub is turned and moved by the engagement of the projection with the cam-groove.

4. The combination in a spigot, of the discharge-pipe, an enlargement carried thereby, a projection carried by said enlargement, a two-part hub carried by said pipe and surrounding the enlarged portion of the same, rings for confining the sections of said hub together, one of said sections having a cam-groove for engagement with the projection carried by the enlargement of the pipe, a discharge-section confined in operative relation with the two-part hub, said discharge-section sliding on said tubular stem as the hub is turned and moved forward by the engagement of the projection with the cam-groove, and a weighted handle carried by said hub whereby it may be operated, said handle serving to keep the spigot closed when in the lowered position.

5. The combination in a spigot, of the discharge-pipe, a projection carried by the same, a two-part rotatable hub carried by said pipe, one section of said hub having a cam-groove to receive the projection of the pipe, and a movable discharge-section mounted on the pipe and in operative engagement with the hub whereby the rotative movement of the latter will cause the discharge-section to be pushed away from the end of the discharge-pipe.

6. The combination in a spigot, of the discharge-pipe, an enlargement carried thereby, a projection carried by said enlargement, a two-part rotatable hub carried by said pipe and surrounding the enlarged portion of the stem, rings for confining the section of said hub together, one of said sections having a cam-groove for engagement with the projection carried by the enlargement of the pipe, and a discharge-section confined in operative relation with the hub and sliding on said pipe as the hub is turned and moved by the engagement of the projection with the cam-groove.

7. The combination in a spigot, of a discharge-pipe, a projection carried thereby, a two-part hub carried by said pipe, means for confining the sections of said hub together, one of said sections having a cam-groove for engagement with the projection carried by the pipe, a discharge-section confined in operative relation with the hub and sliding on said tubular stem as the hub is turned and moved forward by the engagement of the projection with the cam-groove, a guide for said discharge-section, and a weighted handle carried by said hub whereby it may be operated, said handle serving to keep the spigot closed when in the lowered position.

8. The combination in a spigot, of a discharge-pipe, a sliding section carried thereby, a projection carried by said pipe, and a two-part hub carried by said pipe and operatively connected to the sliding section, said hub having means for confining its sections together, an operating-handle and a cam-groove to be engaged by the projection, whereby when said hub is turned, the sliding section will be moved to open the discharge-pipe.

In testimony whereof I have signed my name to this specification in the presence of two subscribing witnesses.

CHAS. A. GILDEMEYER.

Witnesses:
   A. H. SCOTT,
   WM. KUEHN.